US012455069B2

(12) United States Patent
Lu et al.

(10) Patent No.: US 12,455,069 B2
(45) Date of Patent: Oct. 28, 2025

(54) LAMP WITH HYBRID CONNECTOR AND LAMP ASSEMBLY HAVING THE SAME

(71) Applicant: Xiamen PVTECH Co., Ltd., Fujian (CN)

(72) Inventors: Fuxing Lu, Fujian (CN); Xiaoping Lan, Fujian (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 430 days.

(21) Appl. No.: 17/751,607

(22) Filed: May 23, 2022

(65) Prior Publication Data

US 2023/0258323 A1 Aug. 17, 2023

(30) Foreign Application Priority Data

Feb. 14, 2022 (CN) ......................... 202210134560.0

(51) Int. Cl.

*F21V 23/06* (2006.01)
*F21V 19/00* (2006.01)
*H01R 24/84* (2011.01)
*H01R 33/06* (2006.01)
*H01R 33/92* (2006.01)

(52) U.S. Cl.

CPC .......... *F21V 23/06* (2013.01); *F21V 19/0085* (2013.01); *H01R 33/06* (2013.01); *H01R 33/92* (2013.01); *H01R 24/84* (2013.01)

(58) Field of Classification Search

CPC ..... F21V 23/06; F21V 19/0085; H01R 24/84; H01R 33/06; H01R 33/92

See application file for complete search history.

(56) References Cited

U.S. PATENT DOCUMENTS

| | | | | |
|---|---|---|---|---|
| 9,391,380 | B2 * | 7/2016 | Little | H02S 40/32 |
| 9,470,375 | B2 * | 10/2016 | Van Es | F21S 4/20 |
| 9,853,386 | B1 * | 12/2017 | Lee | H01R 13/2421 |
| 10,028,383 | B2 * | 7/2018 | Park | H01R 12/732 |
| 2014/0085896 | A1 | 3/2014 | Li | |

FOREIGN PATENT DOCUMENTS

| | | | |
|---|---|---|---|
| DE | 3940652 | A1 * | 12/1989 |
| JP | 53-53103 | | 12/1978 |
| JP | 2010-98302 | A | 4/2010 |
| WO | 2014/045164 | A1 | 3/2014 |

* cited by examiner

*Primary Examiner* — Renee S Luebke
*Assistant Examiner* — Paul D Baillargeon
(74) *Attorney, Agent, or Firm* — Bruce Stone LLP; Joseph A. Bruce

(57) ABSTRACT

A lamp with hybrid connector is provided, which includes a lamp tube and two lamp caps. The lamp caps are disposed at the two ends of the lamp tube respectively. Each of the lamp caps includes an end surface, two first connection structures and two second connection structure. The end surface has a central point. The first connection structures are disposed on the end surface and are arranged to be symmetrical, about the central point, to each other. The second connection structures are corresponding to the first connection structures. The second connection structures are disposed on the end surface and are arranged to be symmetrical, about the central point, to each other. Since each of the lamp caps has a symmetrical connection structure, any one of the two ends of the lamp tube can be connected to another lamp tube in series.

2 Claims, 8 Drawing Sheets

LAMP WITH HYBRID CONNECTOR AND LAMP ASSEMBLY HAVING THE SAME

BACKGROUND OF THE INVENTION

1. Field of the Invention

The present invention relates to a lamp capable of connecting to another lamp in series, in particular to a lamp having a symmetrical structure.

2. Description of the Prior Art

Lamps are frequently-used products in people's daily lives. A lamp usually includes a light cover, a light source, a power source, a reflector, a diffuser plate, etc.

In some applications, it may be necessary to connect several lamps with each other in series, which may cause the increase of the manufacturing cost of these lamps. Besides, these lamps may be hard to be connected in series because of the design of the connection structure thereof. The above problems may influence the application range or the sales status of theses lamps. Therefore, it has become an important issue to solve to above problems.

SUMMARY OF THE INVENTION

To achieve the foregoing objective, one embodiment of the present invention provides a lamp with hybrid connector, which includes a lamp tube and two lamp caps. The lamp caps are disposed at the two ends of the lamp tube. Each of the lamp caps includes an end surface, two first connection structures and two second connection structures.

The end surface has a central point. The first connection structures are disposed on the end surface and arranged to be symmetrical, about the central point, to each other. The second connection structures are disposed on the end surface and corresponding to the first connection structures. The second connection structures are arranged to be symmetrical, about the central point, to each other.

Another embodiment of the present invention further provides a lamp with hybrid connector, which includes a lamp tube and two lamp caps. The lamp caps are disposed at the two ends of the lamp tube. Each of the lamp caps includes an end surface, four first connection structures and four second connection structures.

The end surface has an upper area and a lower area defined by a horizontal line. The upper area has a first central point and the lower area has a second central point. Two of the four connection structures are disposed on the upper area and arranged to be symmetrical, about the first central point, to each other. The other of the first connection structures are disposed on the lower area and arranged to be symmetrical, about the second central point, to each other. Two of the second connection structures are disposed on the upper area and arranged to be symmetrical, about the first central point, to each other. The other of the second connection structures are disposed on the lower area and arranged to be symmetrical, about the second central point, to each other. The first connection structures and the second connection structures disposed on the upper area are mirror-symmetrical, about the horizontal line, to the first connection structures and the second connection structures disposed on the lower area.

In this embodiment, each of the first connection structures includes a top surface, a connection hole and a conductive post. The connection hole is formed on the top surface and the conductive post is disposed in the connection hole. Each of the second connection structures includes a slot and a conductive tube element. The slot is formed on the end surface and the conductive tube element is disposed in the slot.

Still another embodiment of the present invention further provides a lamp assembly, which includes at least two lamps with hybrid connector and the lamps are connected to each other in series. Each of the lamps includes a lamp tube and two lamp caps. The lamp caps are disposed at the two ends of the lamp tube. Each of the lamp caps includes an end surface, two first connection structures and two second connection structures.

The end surface has a central point. The first connection structures are disposed on the end surface and arranged to be symmetrical, about the central point, to each other. The second connection structures are disposed on the end surface and corresponding to the first connection structures. The second connection structures are arranged to be symmetrical, about the central point, to each other.

Still another embodiment of the present invention further provides a lamp assembly, which includes at least two lamps with hybrid connector and the lamps are connected to each other in series. The lamp caps are disposed at the two ends of the lamp tube. Each of the lamp caps includes an end surface, four first connection structures and four second connection structures.

The end surface has an upper area and a lower area defined by a horizontal line. The upper area has a first central point and the lower area has a second central point. Two of the four connection structures are disposed on the upper area and arranged to be symmetrical, about the first central point, to each other. The other of the first connection structures are disposed on the lower area and arranged to be symmetrical, about the second central point, to each other. Two of the second connection structures are disposed on the upper area and arranged to be symmetrical, about the first central point, to each other. The other of the second connection structures are disposed on the lower area and arranged to be symmetrical, about the second central point, to each other. The first connection structures and the second connection structures disposed on the upper area are mirror-symmetrical, about the horizontal line, to the first connection structures and the second connection structures disposed on the lower area.

In this embodiment, each of the first connection structures includes a top surface, a connection hole and a conductive post. The connection hole is formed on the top surface and the conductive post is disposed in the connection hole. Each of the second connection structures includes a slot and a conductive tube element. The slot is formed on the end surface and the conductive tube element is disposed in the slot.

To sum up, according to the lamp with hybrid connector disclosed in one embodiment of the present invention, since the each of the lamp caps disposed at the two ends of the lamp tube has a symmetrical connection structure, any one of the two ends of the lamp tube can be connected to another lamp tube in series, which is more convenient in use. Besides, according to the lamp with hybrid connector disclosed in one embodiment of the present invention, as each of the lamp caps disposed at the two ends of the lamp tube has the symmetrical connection structure, the manufacturing cost of the lamp with hybrid connector can be less than that of currently available lamps, which can effectively achieve the sales growth of the lamp with hybrid connector.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

The technical content of the present invention will become apparent by the detailed description of the following embodiments and the illustration of related drawings as follows.

Figure 1:
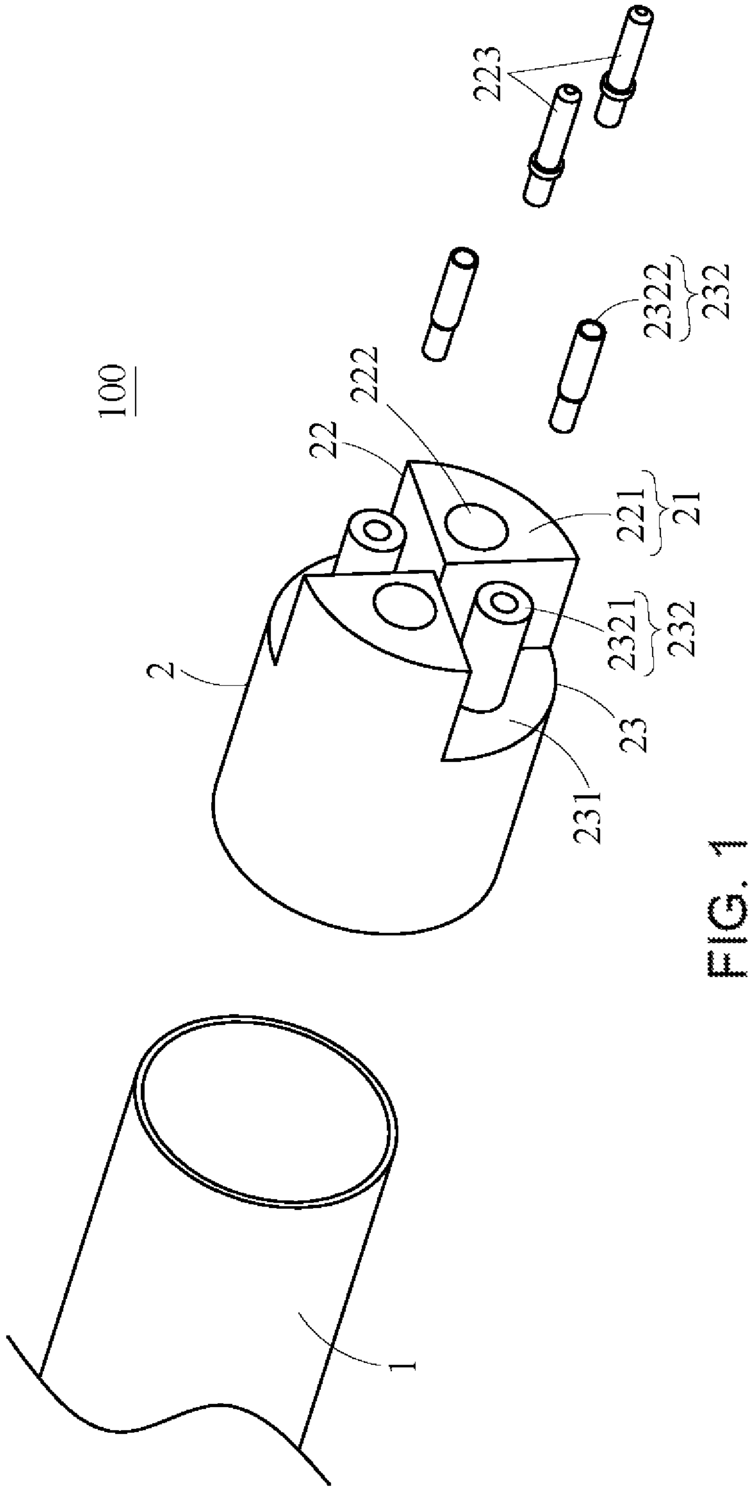
FIG. 1 is a partially exploded view of a lamp with hybrid connector in accordance with one embodiment of the present invention.
Figure 2:
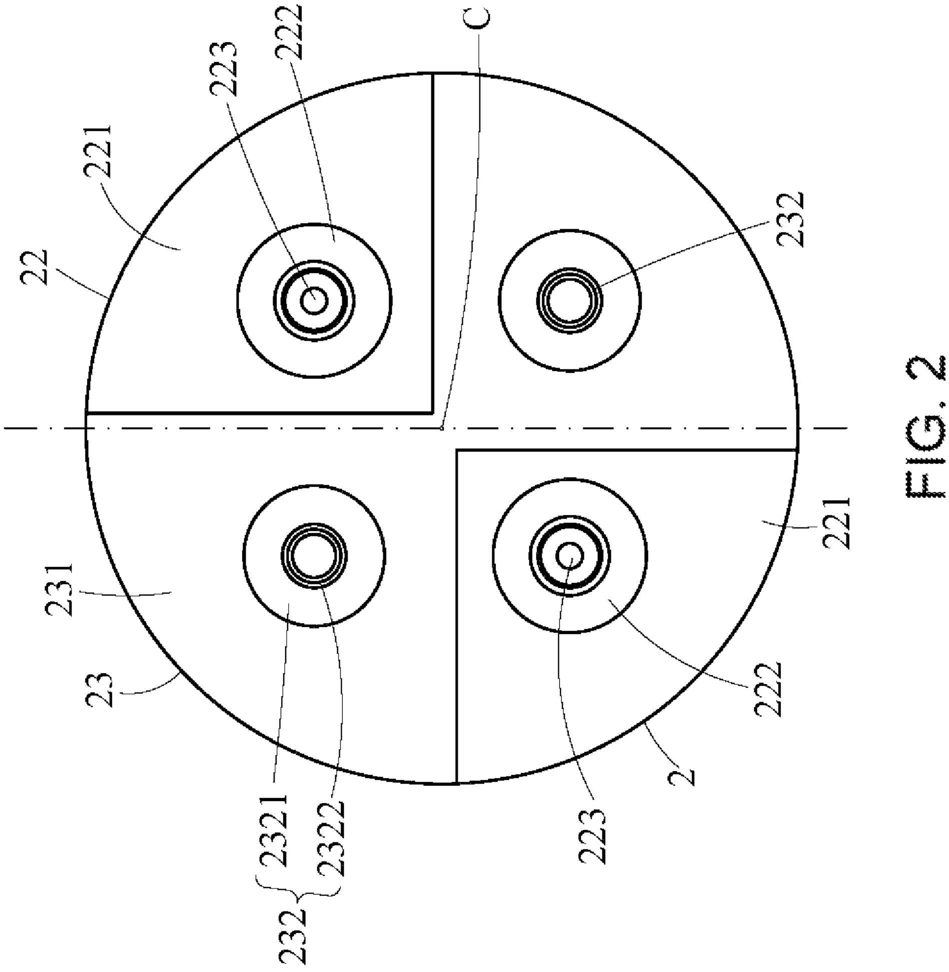
FIG. 2 is a front view of the lamp with hybrid connector shown in FIG. 1.
Figure 3:
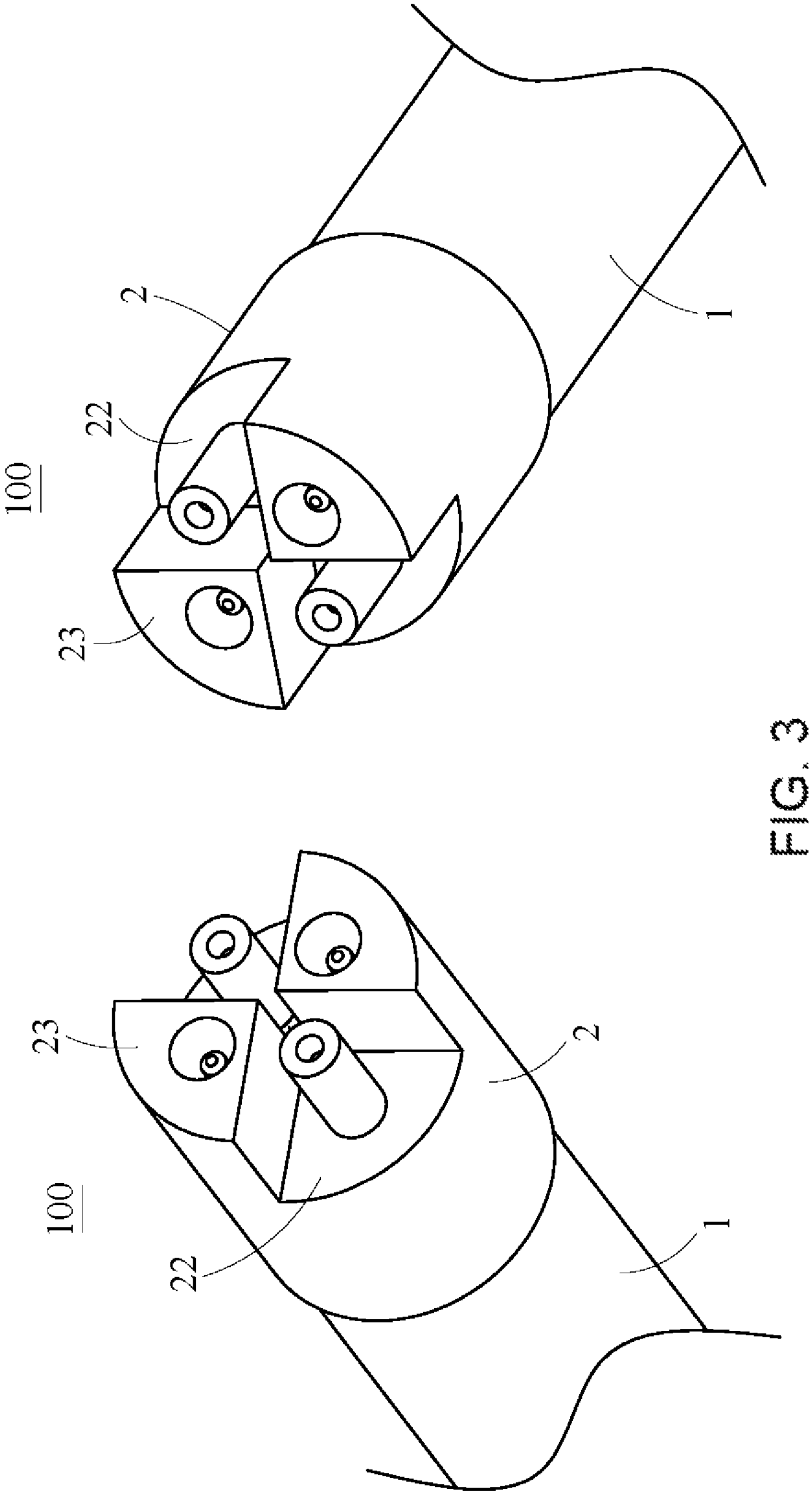
FIG. 3 is a partially structural view of the lamp with hybrid connector shown in FIG. 1, which shows the two ends of the lamp.

Please refer to FIG. 1, FIG. 2 and FIG. 3. FIG. 1 is a partially exploded view of a lamp 100 with hybrid connector in accordance with one embodiment of the present invention. FIG. 2 is a front view of the lamp 100 with hybrid connector shown in FIG. 1. FIG. 3 is a partially structural view of the lamp 100 with hybrid connector shown in FIG. 1, which shows the two ends of the lamp 100.

The lamp 100 with hybrid connector includes a lamp tube 1 and two lamp caps 2. The lamp caps 2 are disposed at the two ends of the lamp tube 1. Each of the lamp caps 2 includes an end surface 21, two first connection structures 22 and two second connection structures 23.

The end surface 21 has a central point C. The first connection structures 22 are disposed on the end surface 21. The first connection structures 22 are arranged to be symmetrical, about the central point C, to each other. As described above, the first connection structures 22 are arranged to be in point symmetry. That is to say, after rotating about the central point C clockwise or counterclockwise for 180°, one of the first connection structures 22 can overlap the other of the first connection structures 22. The two second connection structures 23 are disposed on the end surface 21 and corresponding to the two first connection structures 22. The second connection structures 23 are arranged to be symmetrical, about the central point C, to each other (in point symmetry).

As shown in FIG. 1-FIG. 3, the first connection structure 22 includes a top surface 221, a connection hole 222 and a conductive post 223. The connection hole 222 is formed on the top surface 221 and the conductive post 223 is disposed in the connection hole 222. The second connection structure 23 includes a slot 231 and a conductive tube element 232. The slot 231 is formed on the end surface 21 and the conductive tube element 232 is disposed in the slot 231. In this embodiment, the conductive tube element 232 includes a conductive tube 2321 and a conductive sleeve 2322, and the conductive sleeve 2322 is disposed in the conductive tube 2321. In one embodiment, the conductive post 223 is a copper post. In one embodiment, the material of the conductive tube 2321 is the same with that of the lamp cap 2 and the conductive sleeve 2322 is a copper sleeve.

Figure 4:
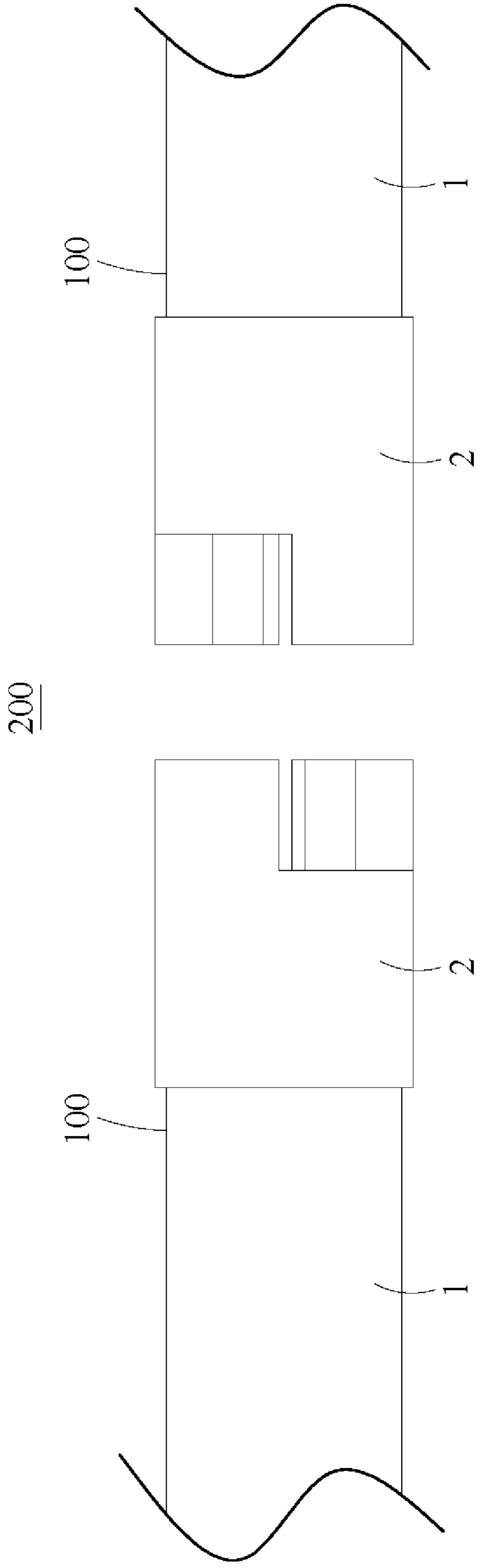
FIG. 4 is a schematic view of use of a lamp assembly in accordance with one embodiment of the present invention.

Please refer to FIG. 4, which is a schematic view of use of a lamp assembly in accordance with one embodiment of the present invention. The lamp assembly 200 includes at least two lamps 100 with hybrid connector shown in FIG. 3. The lamps 200 with hybrid connector are connected to each other in series. Via this structure, the user can easily replace any one of the lamps 100. That is to say, any one of the two ends of the lamp 100 can be connected to another lamp 100, which can significantly reduce the time of assembling the lamp assembly 200. This structure can also effectively reduce the manufacturing cost of the lamp 100.

Figure 5:
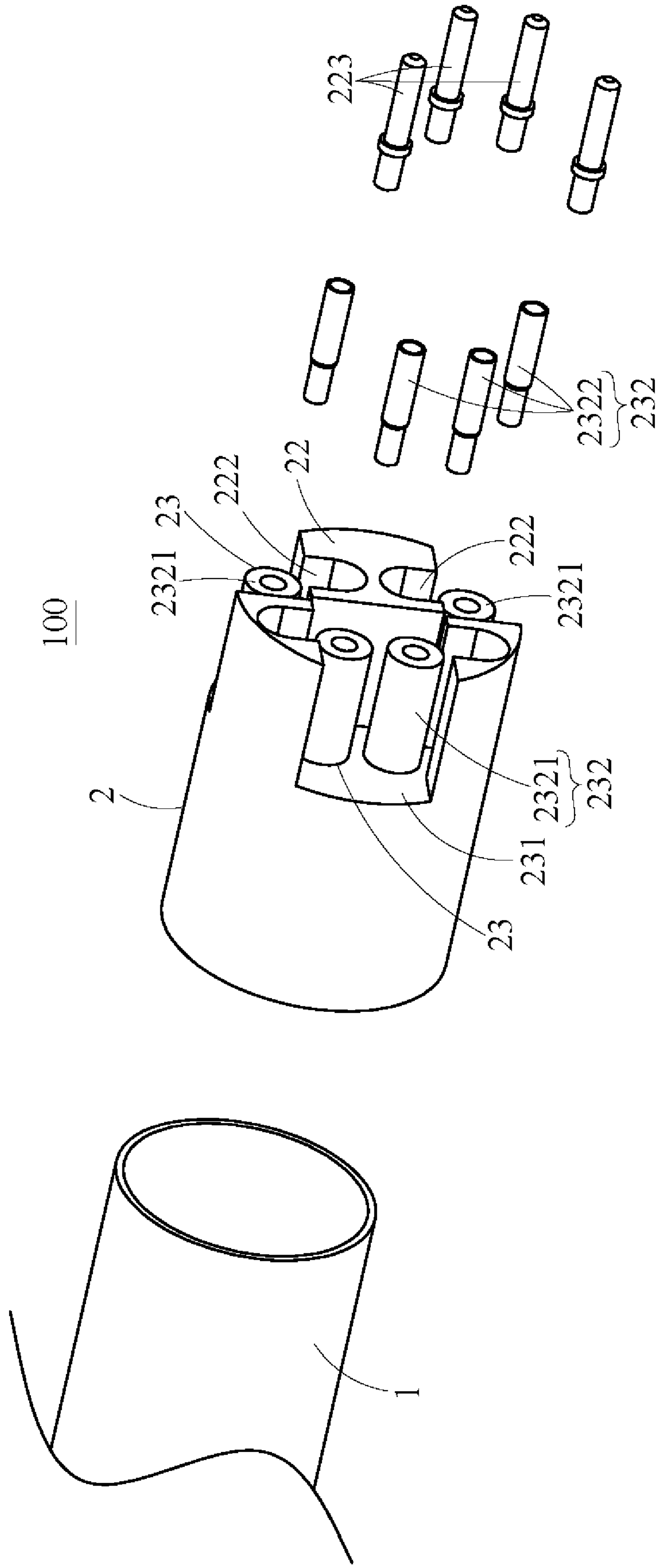
FIG. 5 is a partially exploded view of a lamp with hybrid connector in accordance with one embodiment of the present invention.
Figure 6:
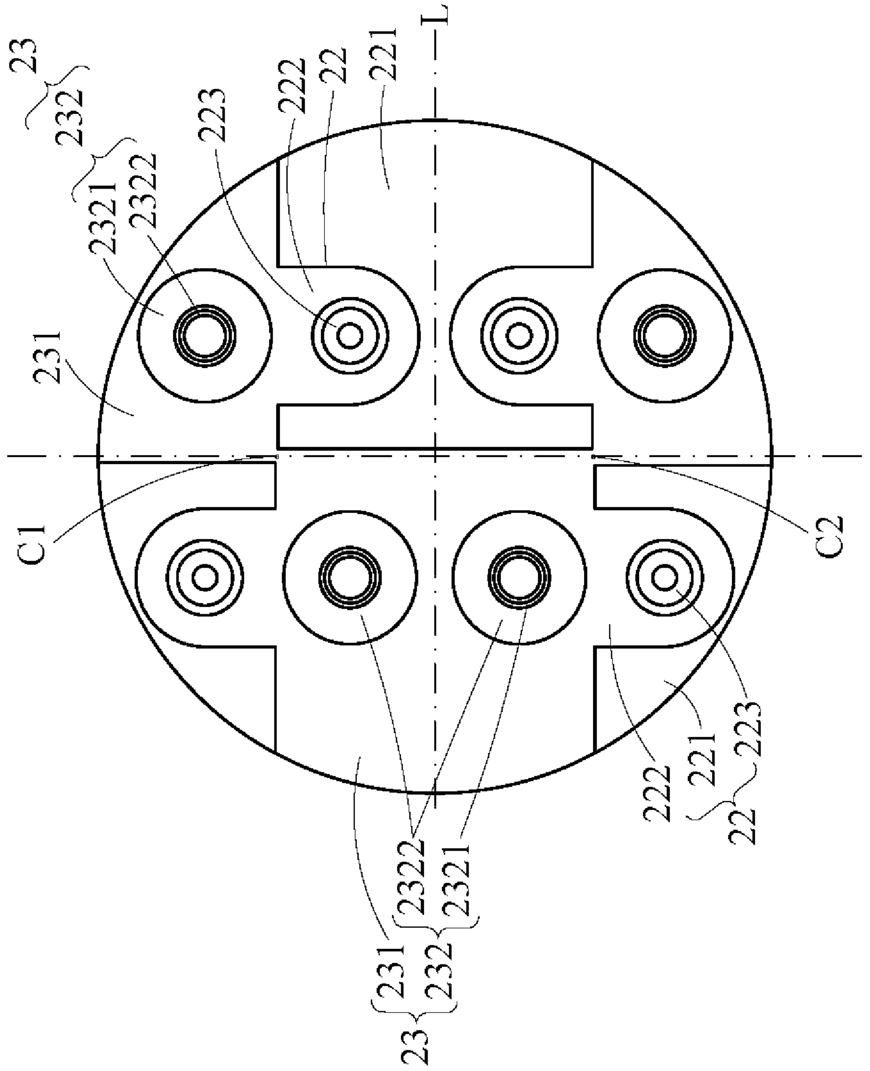
FIG. 6 is a front view of the lamp with hybrid connector shown in FIG. 5.
Figure 7:
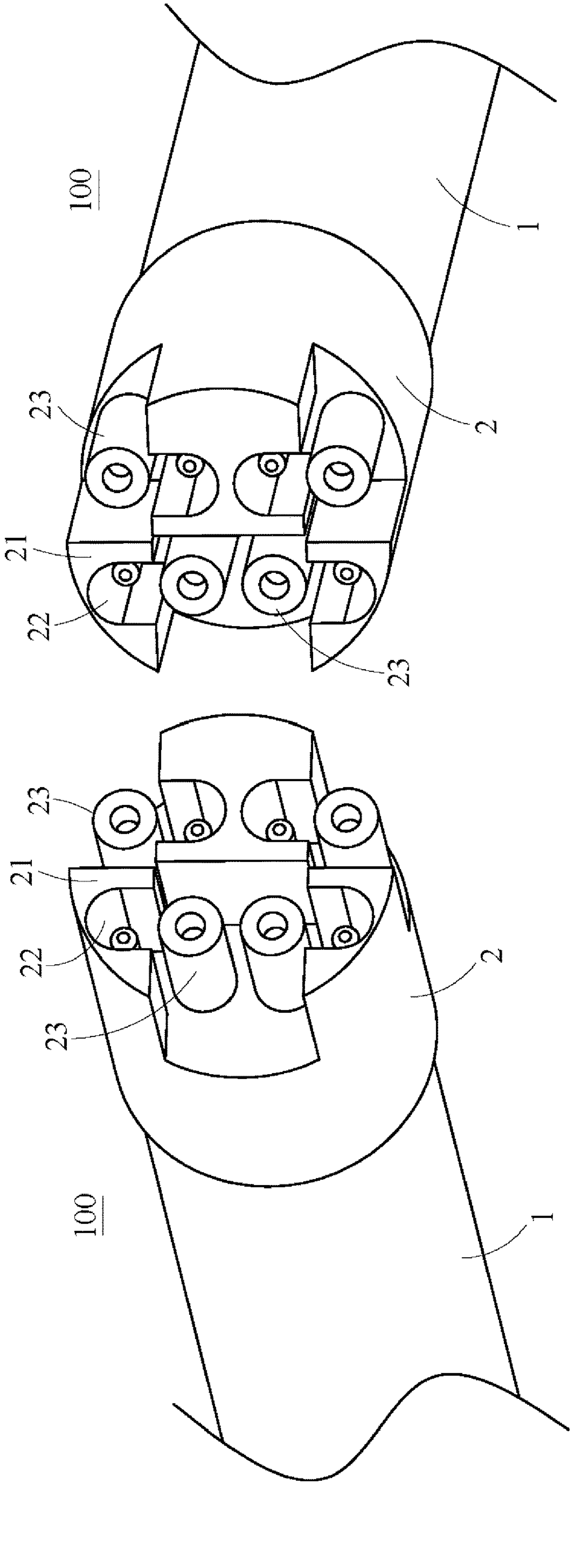
FIG. 7 is a partially structural view of the lamp with hybrid connector shown in FIG. 5, which shows the two ends of the lamp.

Please refer to FIG. 5, FIG. 6 and FIG. 7. FIG. 5 is a partially exploded view of a lamp 100 with hybrid connector in accordance with one embodiment of the present invention. FIG. 6 is a front view of the lamp 100 with hybrid connector shown in FIG. 5. FIG. 7 is a partially structural view of the lamp 100 with hybrid connector shown in FIG. 5, which shows the two ends of the lamp 100.

As shown in FIG. 5-FIG. 7, the lamp 100 with hybrid connector includes a lamp tube 1 and two lamp caps 2. The lamp caps 2 are disposed at the two ends of the lamp tube 1. Each of the lamp caps 2 includes an end surface 21, four first connection structures 22 and four second connection structures 23. The end surface 21 has an upper area 211 and a lower area 212 defined by a horizontal line L. The upper area 211 has a first central point C1 and the lower area 212 has a second central point C2. Two of the four connection structures 22 are disposed on the upper area 211 and arranged to be symmetrical, about the first central point C1, to each other (in point symmetry). The other of the first connection structures 22 are disposed on the lower area 212 and arranged to be symmetrical, about the second central point C2, to each other (in point symmetry). Two of the second connection structures 23 are disposed on the upper area 211 and arranged to be symmetrical, about the first central point C1, to each other (in point symmetry). The other of the second connection structures 23 are disposed on the lower area 212 and arranged to be symmetrical, about the second central point C2, to each other (in point symmetry). The first connection structures 22 and the second connection structures 23 disposed on the upper area 211 are mirror-symmetrical, about the horizontal line L, to the first connection structures 22 and the second connection structures 23 disposed on the lower area 212. As set forth above, the first connection structures 22 and the second connection structures 23 disposed on the upper area 211 and the lower area 212 are in mirror symmetry. That is to say, after the end surface 21 are folded along the horizontal line L, the first connection structures 22 on the upper area 211 can overlap the first connection structures 22 on the lower area 212, and the second connection structures 23 on the upper area 211 can also overlap the second connection structures 23 on the lower area 212.

The detailed structures of the first connection structures 22 and the second connection structures 23 have been described in the previous embodiment, so will not be described herein again.

Figure 8:
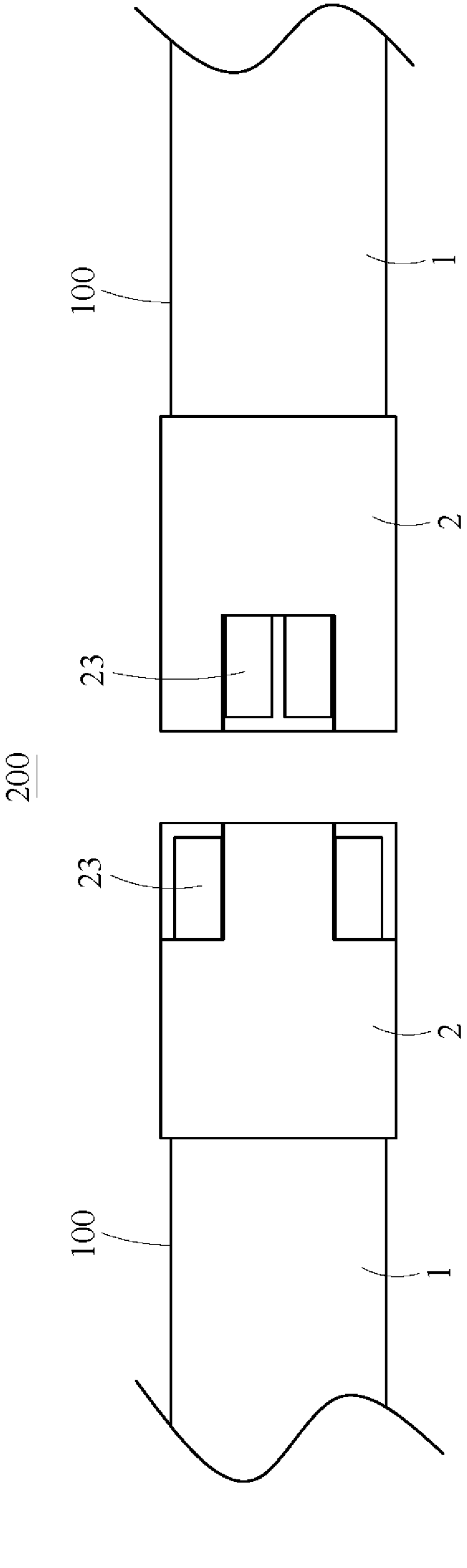
FIG. 8 is a schematic view of use of a lamp assembly in accordance with one embodiment of the present invention.

Please refer to FIG. 8, which is a schematic view of use of a lamp assembly in accordance with one embodiment of the present invention. The lamp assembly 200 includes at least two lamps 100 with hybrid connector shown in FIG. 7. The lamps 200 with hybrid connector are connected to each other in series. Via this structure, the user can easily replace any one of the lamps 100. In other words, any one of the two ends of the lamp 100 can be connected to another lamp 100, which can significantly reduce the time of assembling the lamp assembly 200. This structure can also effectively reduce the manufacturing cost of the lamp 100.

To sum up, according to the lamp with hybrid connector disclosed in one embodiment of the present invention, since the each of the lamp caps disposed at the two ends of the lamp tube has a symmetrical connection structure, any one of the two ends of the lamp tube can be connected to another lamp tube in series, which is more convenient in use. Besides, according to the lamp with hybrid connector disclosed in one embodiment of the present invention, as each of the lamp caps disposed at the two ends of the lamp tube has the symmetrical connection structure, the manufacturing cost of the lamp with hybrid connector can be less than that of currently available lamps, which can effectively achieve the sales growth of the lamp with hybrid connector.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. A lamp with hybrid connector, comprising:

a lamp tube, and two lamp caps, disposed at two ends of the lamp tube, wherein each of the lamp caps comprises:

an end surface, having a central point;

two first connection structures, disposed on the end surface, wherein the first connection structures are arranged to be symmetrical, about the central point, to each other, wherein each of the first connection structures comprises a top surface, a connection hole and a conductive post, and the connection hole is formed on the top surface and the conductive post is disposed in the connection hole, whereby the first connection structures serve as female connectors; and two second connection structures, disposed on the end surface and corresponding to the first connection structures, wherein the second connection structures are arranged to be symmetrical, about the central point, to each other, wherein each of the second connection structures comprises a slot and a conductive tube element, the slot is formed on the end surface and the conductive tube element is disposed in the slot, wherein the conductive tube element comprises a conductive tube and a conductive sleeve disposed in the conductive tube, whereby the second connection structures serve as male connectors;

wherein the first connection structures are fan-shaped columns, causing a cross-section of each of the first connection structures to be a quarter-circle, and a plane passing through one side surface of one of the first connection structures is parallel to but at a distance from a plane passing through one side surface of another of the first connection structures, and a plane passing through another side surface of one of the first connection structures is parallel to but at a distance from a plane passing through another side surface of another of the first connection structures.

2. A lamp assembly, comprising at least two lamps with hybrid connector and the lamps are connected to each other in series, wherein each of the lamps comprises:

a lamp tube, and two lamp caps, disposed at two ends of the lamp tube, wherein each of the lamp caps comprises:

an end surface, having a central point;

two first connection structures, disposed on the end surface, wherein the first connection structures are arranged to be symmetrical, about the central point, to each other, wherein each of the first connection structures comprises a top surface, a connection hole and a conductive post, and the connection hole is formed on the top surface and the conductive post is disposed in the connection hole, whereby the first connection structures serve as female connectors; and two second connection structures, disposed on the end surface and corresponding to the first connection structures, wherein the second connection structures are arranged to be symmetrical, about the central point, to each other, wherein each of the second connection structures comprises a slot and a conductive tube element, the slot is formed on the end surface and the conductive tube element is disposed in the slot, wherein the conductive tube element comprises a conductive tube and a conductive sleeve disposed in the conductive tube, whereby the second connection structures serve as male connectors;

wherein the first connection structures are fan-shaped columns, causing a cross-section of each of the first connection structures to be a quarter-circle, and a plane passing through one side surface of one of the first connection structures is parallel to but at a distance from a plane passing through one side surface of another of the first connection structures, and a plane passing through another side surface of one of the first connection structures is parallel to but at a distance from a plane passing through another side surface of another of the first connection structures.

* * * * *